United States Patent
Wu

(10) Patent No.: US 6,669,504 B2
(45) Date of Patent: Dec. 30, 2003

(54) COIN BATTERY CONNECTOR

(75) Inventor: Jerry Wu, Pan-Chiao (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/040,024

(22) Filed: Jan. 3, 2002

(65) Prior Publication Data

US 2003/0124902 A1 Jul. 3, 2003

(51) Int. Cl.[7] ................................................ H01R 3/00
(52) U.S. Cl. ...................................................... 439/500
(58) Field of Search ................................ 439/500, 626, 439/627

(56) References Cited

U.S. PATENT DOCUMENTS

| | | | | |
|---|---|---|---|---|
| 5,931,693 A | * | 8/1999 | Yamazaki | 439/500 |
| 5,980,309 A | * | 11/1999 | Frantz et al. | 439/500 |
| 6,093,056 A | * | 7/2000 | Donauer et al. | 439/500 |
| 6,142,823 A | * | 11/2000 | Ishibashi | 439/500 |
| 6,220,892 B1 | * | 4/2001 | Bishop | 439/500 |

* cited by examiner

*Primary Examiner*—Gary Paumen
(74) *Attorney, Agent, or Firm*—WeiG Te Chung

(57) ABSTRACT

A coin battery connector includes an insluative housing having a flat base and two pairs of walls extending from the flat base, defining a cavity therebetween for receiving a coin battery. Positive and negative terminals are mounted to the housing for respectively engaging positive and negative electrodes of the battery. The positive terminal includes a base secured to the housing and a contact panel extending from the base for engaging the positive electrode of the battery. Two retention arms extends from the contact panel and have a major surface inclined with respect to an insertion direction of the battery for guiding and facilitating insertion of the battery into the housing. The retention arms have downward directed free ends for engaging and retaining the battery in the housing. A spring tab is formed on the contact panel for biasing the battery against the downward directed ends of the retention arms. The negative terminal has a bifurcate configuration having two spaced, longitudinally extending spring arms project upward from a bottom of the housing in an inclined direction into the housing. Each spring arm has a contact for engaging with the negative electrode of the battery. The contacts of the spring arms of the negative terminal are offset with respect to each other in the longitudinal direction and also in a transverse direction to ensure more reliable engagement of the negative terminal with the battery.

11 Claims, 5 Drawing Sheets

COIN BATTERY CONNECTOR

BACKGROUND OF THE INVENTION

1. Field of the Invention

The present invention generally relates to the field of battery connectors, and more particular to a coin battery connector.

2. The Related Arts

Coin batteries that have a disk-shape are often employed in electronic equipments, such as computers, as additional power source or back up power source. Although there are a variety of coin batteries of different sizes available in the market, most of them are very small and are thus sometimes referred to as "button batteries". The coin battery has two major surfaces respectively forming positive and negative electrodes. The positive electrode also extends to a circumferential edge of the disk-shape.

The coin battery is mounted to a circuit board by a "battery connector". The battery connector comprises a housing defining a central cavity for receiving the coin battery. Conductive terminals for positive and negative electrodes of the battery are fixed to the housing and electrically connected to the circuit board. A conventional coin battery connector is shown in U.S. Pat. No. 5,980,309 wherein an insulative housing of the connector comprises first and second pairs of side walls delimiting a cavity for receiving the coin battery. Each side wall has a inwardly directed retention flange for securing the battery in the housing. To mount/dismount the battery to/from the housing, two of the side walls are deflected. Inclined surfaces are formed on the side walls for facilitating insertion of the battery into the housing. Since the housing and the side walls are integrally formed with synthetic materials which possess relatively low yielding strength as compared to metals, the side walls may be accidentally broken in mounting/dismounting the battery. Further, the provision of the inclined surface in the retention flanges of the side walls inevitably increases the overall height of the battery connector.

Taiwan Patent Application Nos. 87201003 and 87210779 teach using a metallic member of the positive terminal to form releasable retention means. However, a great force is required to deflect a metal plate of substantial surface area in these conventional designs. In addition, although Taiwan Patent Application No. 87201003 discloses a manual tab for bending the metal plate, the tab is short and small and thus difficult to operate. In addition, inclined surfaces formed on a side wall of the housing are also required in these Taiwan patents, sharing the same problem of size as the previously discussed U.S. patent.

Taiwan Patent Application Nos. 83211243, 83211243A01 and 83211243A02 and Chinese Patent No. 99236125.7 all disclose a battery connector comprising a U-shaped positive terminal. A pair of projections are formed on one limb of the U-shape for retaining a battery in the housing. Since the projections are formed by bending a portion of said limb of the U-shape, a major surface of each projection is substantially parallel to the moving direction of the battery when the battery is inserted into the housing. This makes the projections very resistant to the insertion of the battery. Thus, to mount/dismount the battery to/from the housing, deflecting or bending the limb that is a plate of substantial surface area is required. This causes difficulty in handling the battery, especially when the small size of the battery is taken into account.

In addition, the conventional battery connector has a negative terminal mounted to a bottom of the housing. The negative terminal has a longitudinally extending spring arm projecting in an inclined direction into the housing. The spring arm has an end forming a single contact for engaging the negative electrode of a battery. Some of the conventional battery connectors employ a bifurcate configuration, forming two transversely spaced contacts for more reliably engaging the battery. However, reliability of engagement between the negative terminal and battery can be improved in the longitudinal direction.

It is thus desirable to provide a coin battery connector that alleviates or even overcomes the above disadvantages.

SUMMARY OF THE INVENTION

Accordingly, an object of the present invention is to provide a coin battery connector that allows ready insertion of a coin battery therein.

Another object of the present invention is to provide a coin battery connector that allows a coin battery to be inserted into the connector with a low insertion force.

A further object of the present invention is to provide a coin battery connector having longitudinally and transversely offset bifurcate negative terminal for more reliable engagement with a negative electrode of a battery.

A further object of the present invention is to provide a coin battery connector comprising a positive terminal forming two tabs having a major surface inclined with respect to an insertion direction of a battery for guiding and enhancing insertion of the battery into the connector.

Yet a further object of the present invention is to provide a coin battery connector having a positive terminal forming two retention arms having ends pointing to the battery for preventing the battery from moving out of the connector.

A further object of the present invention is to provide a coin battery connector having a positive terminal comprising a manual operation arm for manually disengaging the positive terminal from the battery.

To achieve the above objects, in accordance with the present invention, a coin battery connector comprises an insluative housing having a flat base and two pairs of walls extending from the flat base, defining a cavity therebetween for receiving a coin battery. Positive and negative terminals are mounted to the housing for respectively engaging positive and negative electrodes of the battery. The positive terminal comprises a base secured to the housing and a contact panel extending from the base for engaging the positive electrode of the battery. Two retention arms extends from the contact panel and have a major surface inclined with respect to an insertion direction of the battery for guiding and facilitating insertion of the battery into the housing. The retention arms have downward directed free ends for engaging and retaining the battery in the housing. A spring tab is formed on the contact panel for biasing the battery against the downward directed ends of the retention arms. The negative terminal has a bifurcate configuration comprising two spaced, longitudinally extending spring arms project upward from a bottom of the housing in an inclined direction into the housing. Each spring arm has a contact for engaging with the negative electrode of the battery. The contacts of the spring arms of the negative terminal are offset with respect to each other in the longitudinal direction and also in a transverse direction to ensure more reliable engagement of the negative terminal with the battery.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
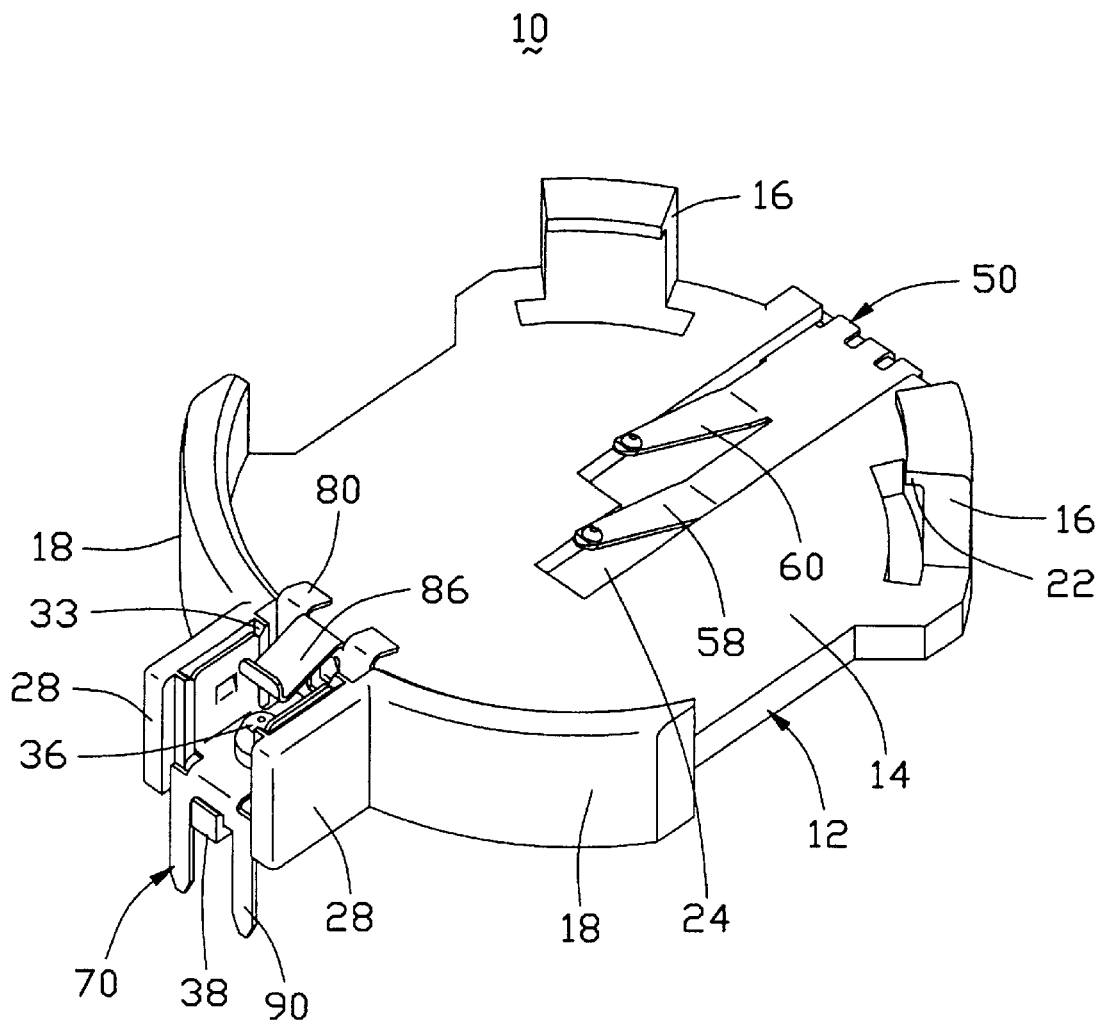
FIG. 1 is a perspective view of a coin battery connector constructed in accordance with the present invention.
Figure 2:
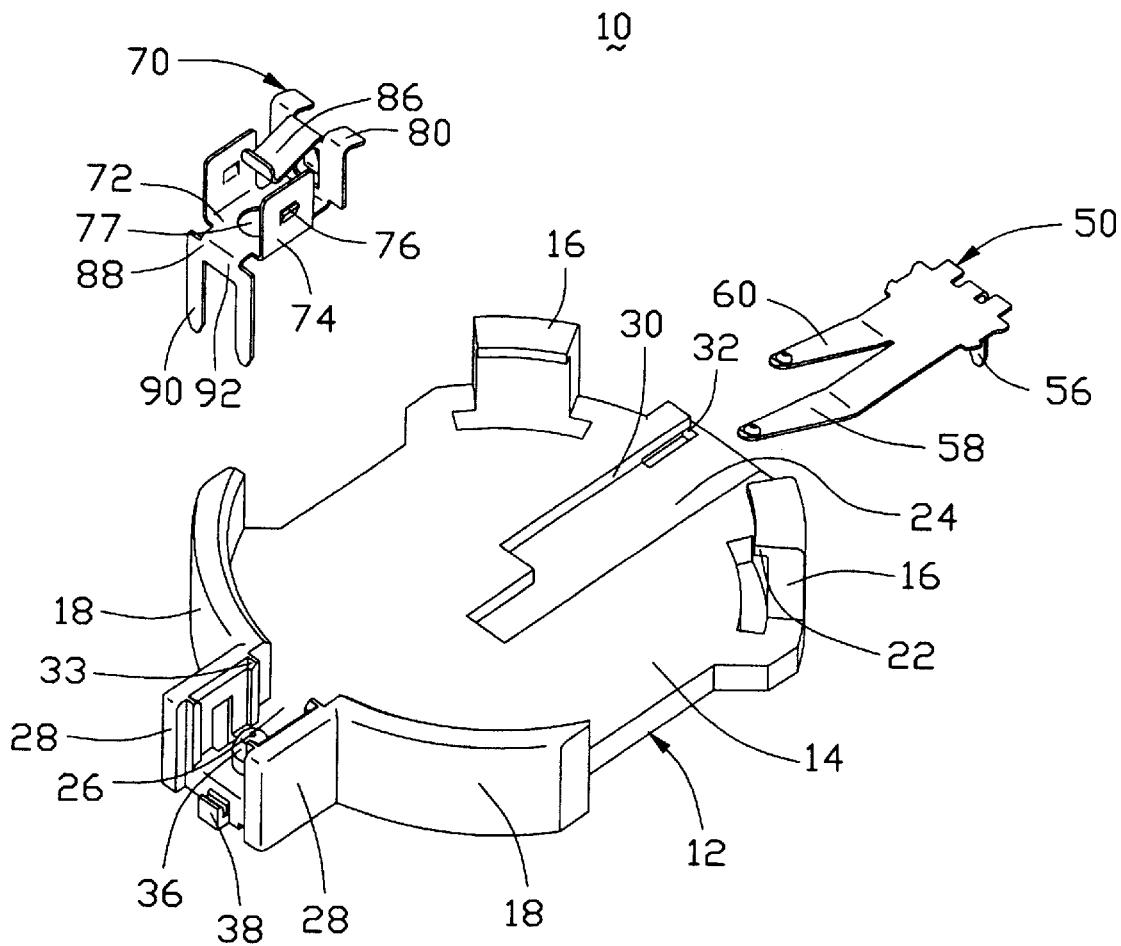
FIG. 2 is an exploded view of the coin battery connector of the present invention.
Figure 4:
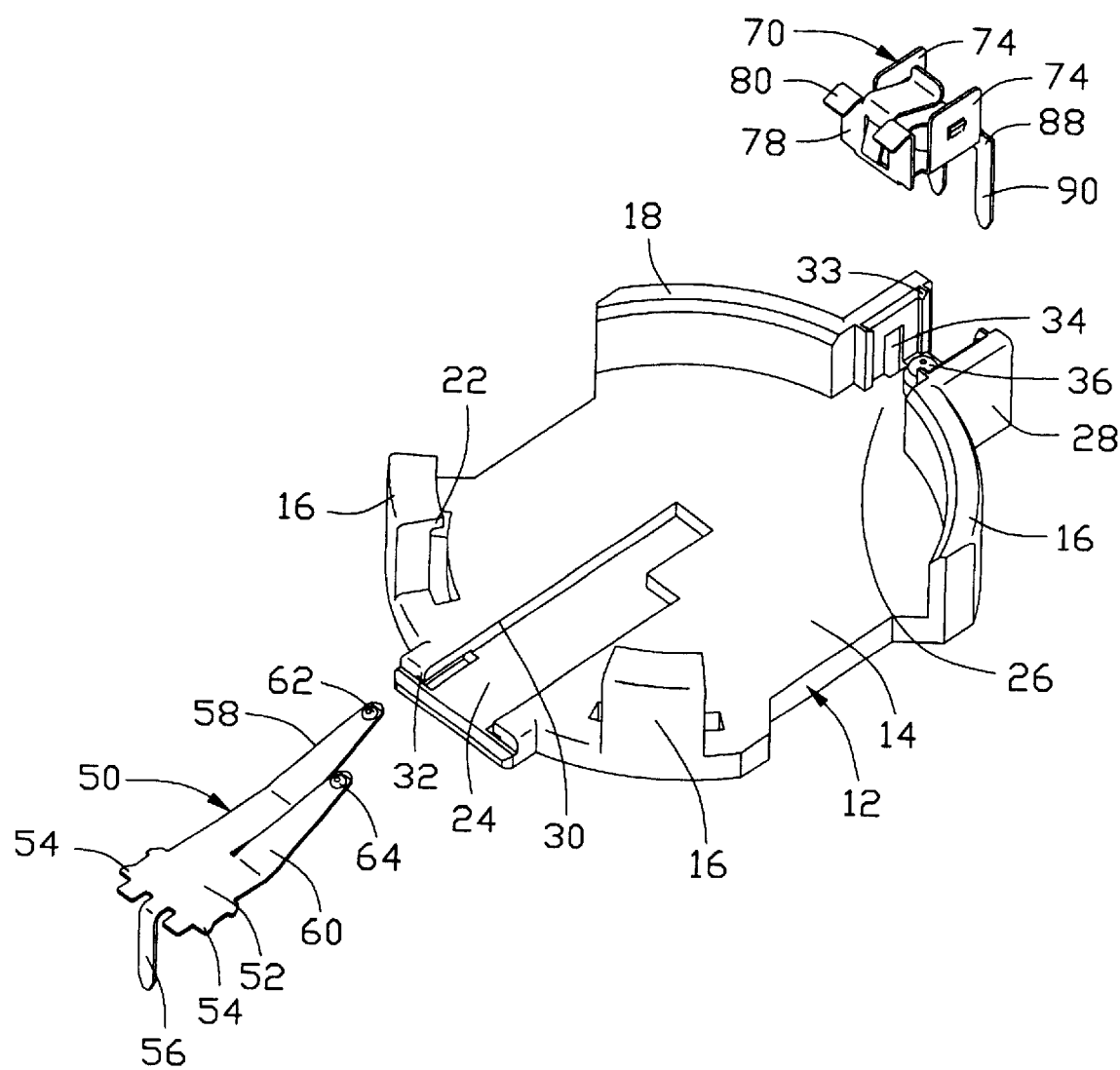
FIG. 4 is an exploded view of the coin battery connector of the present invention, taken from a different perspective.

With reference to the drawings and in particular to FIGS. 1, 2 and 4, a coin battery connector constructed in accordance with the present invention, generally designated with reference numeral 10, comprises an insulative housing 12 to which negative and positive terminals 50, 70 made of conductive materials are mounted.

Figure 3:
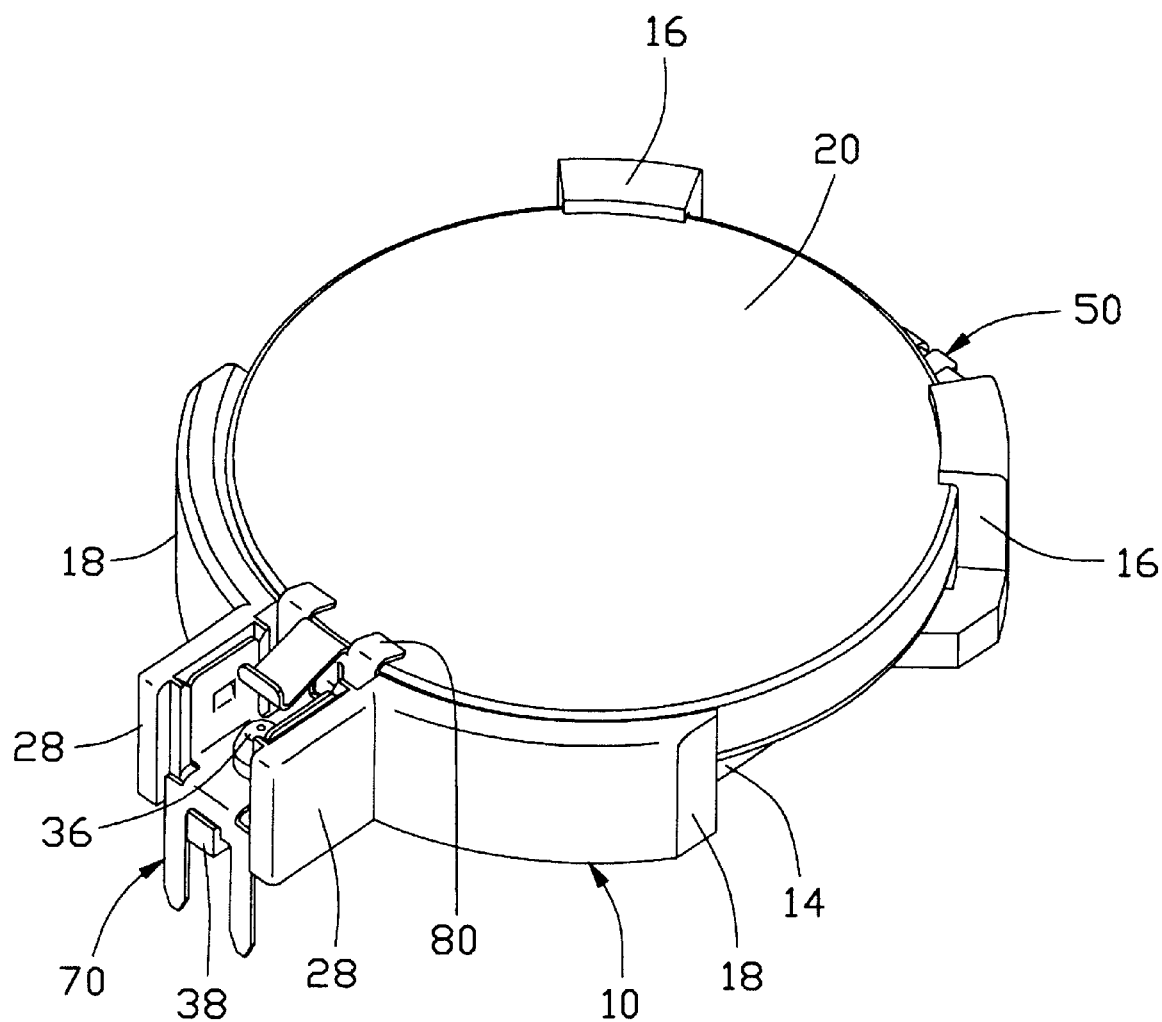
FIG. 3 is a perspective view of the coin battery connector of the present invention with a battery mounted therein.

The housing 12 comprises a flat base 14 extending in a horizontal direction. The flat base 14 has a bottom surface (not labeled) to be positioned on for example a circuit board (not shown) and an opposite top surface (not labeled) from which a pair of first walls 16 and a pair of second walls 18 extend upwards in a vertical direction. The walls 16, 18 are preferably arcuate and extend along an imaginary circle to delimit a cavity (not labeled) therebetween above the base 14 for accommodating a battery 20 (FIG. 3). Each first wall 16 has an inwardly directed flange 22 for engaging and thus retaining the battery 20 in the cavity of the housing 12. To minimize an overall height of the connector housing 12, the flanges 22 are made completely flat on a top side thereof.

Each first wall 16 is substantially aligned with a corresponding one of the second walls 18 in a longitudinal direction with first and second slots 24, 26 defined in the housing 12 respectively between the first walls 16 and between the second walls 18 whereby the first and second slots 24, 26 are aligned in the longitudinal direction. The second slot 26 is defined between two spaced and substantially parallel extensions 28 of the second walls 18. The negative and positive terminals 50, 70 are respectively received and retained in the first and second slots 24, 26.

The first slot 24 is defined by a recess formed in the top surface of the flat base 14 and having a flat bottom (not labeled) and opposite side walls 30. A slit 32 is defined in each side wall 30 (also see FIG. 4). The negative terminal 50 comprises a flat section 52 received in the first slot 24 and positioned on the flat bottom of the first slot 24. Barbs 54 are formed on opposite lateral edges (not labeled) of the flat section 52 and interferentially received in the slits 32 to retain the negative terminal 50 in the first slot 24. A soldering tail 56 extends perpendicularly from an outer edge (not labeled) of the flat section 52 of the negative terminal 50 for engaging with and being soldered to the circuit board.

An inner edge (not labeled) of the flat section 52 forms a bifurcate configuration comprising two split spring arms 58, 60 disposed side by side in a transverse direction substantially normal to the longitudinal direction. Each spring arm 58, 60 extends in an inclined direction away from the housing base 14 and into the cavity of the housing 12 whereby a free end of each spring arm 58, 60 is located above the flat section 52 and inside the cavity. The free end of the spring arm 58, 60 forms a contact 62, 64 for electrically engaging the battery 20.

The spring arms 58, 60 are dimensioned to have the contacts 62, 64 longitudinally offset with respect to each other whereby the contacts 62, 64 are offset from each other in both the longitudinal direction and the transverse direction to ensure reliable engagement of the negative terminal 50 with a negative electrode of the battery 20.

Figure 5:
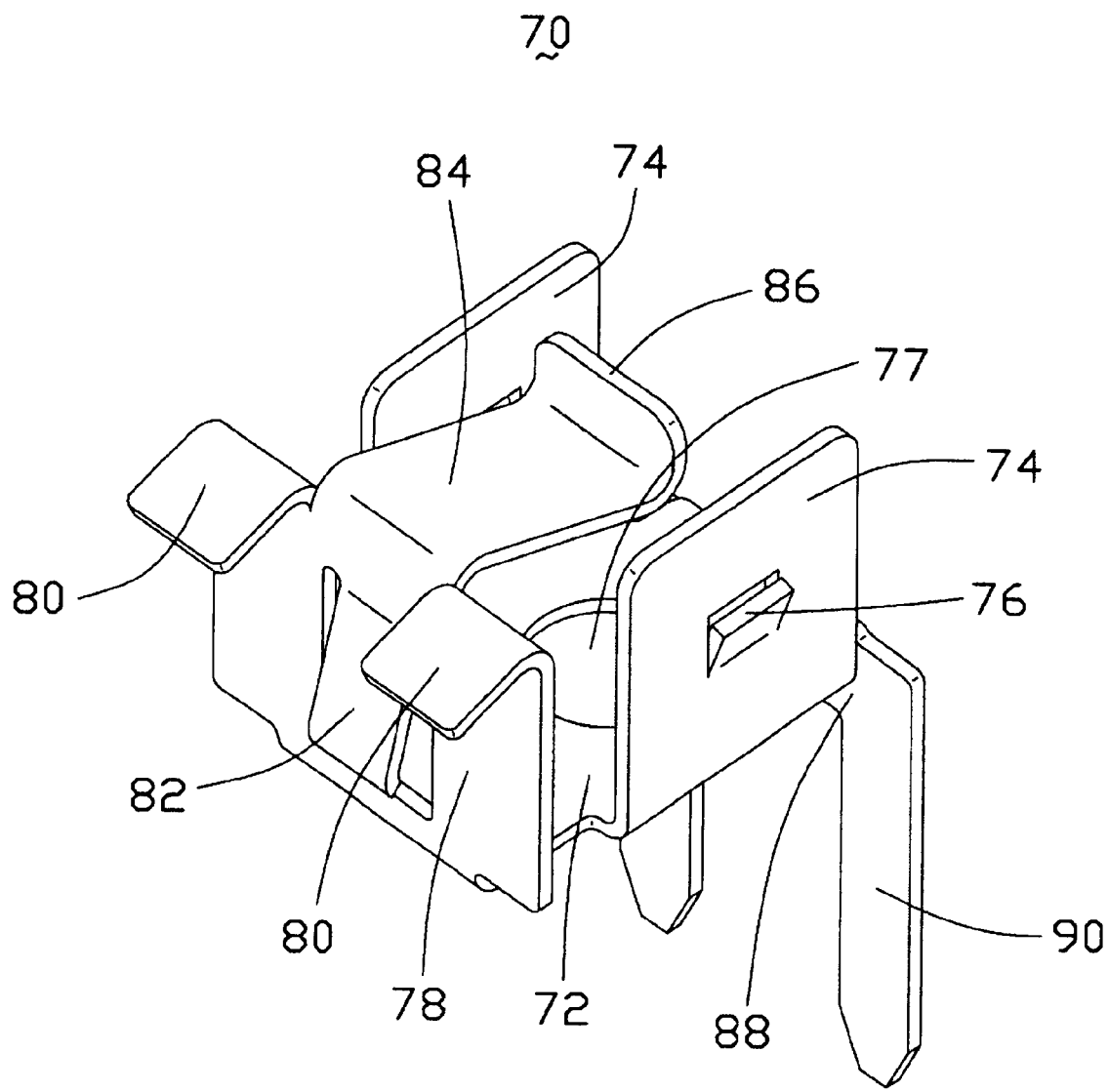
FIG. 5 is a perspective view of a positive terminal of the coin battery connector of the present invention.

Also referring to FIG. 5, the positive terminal 70 comprises a base panel 72 and two side panels 74 extending from opposite edges of the base panel 72. The base panel 72 is received in the second slot 26 of the housing 12 with side panels 74 overlapping inner surfaces (not labeled) of the extension walls 28. Preferably, a slot 33 is defined in the inner surface of each extension wall 28 for receiving the side panel 74 therein. Each side panel 76 forms an outward projection 76 engaging a notch 34 defined in the inner surface of the corresponding extension wall 28 to secure the positive terminal 70 in the second slot 26. A boss 36 having a reduced free end is formed in the second slot 26 of the housing 12 and is fit into a hole 77 defined in the base panel 72 for positioning and retaining the positive terminal 70 in the second slot 26.

A contact panel 78 extends from the base panel 72 in a direction substantially perpendicular the flat base 14 of the housing 12, namely the vertical direction, and substantially aligned with the second walls 18 and engageable with a circumferential edge of the battery 20 that is part of a positive electrode of the battery 20. The contact panel 78 has a top free edge from which two retention arms 80 extend into the cavity of the housing 12 for engaging a top face of the battery 20 thereby securing the battery 20 in the housing 12. The retention arms 80 are plate-like tabs extending from the top edge of the contact panel 78, each having a major surface inclined in a direction toward the flat base 14 of the housing 12 (namely vertically downward) with a predetermined angle whereby the major surface of the retention arm 80 is inclined with respect to both the flat base 14 of the housing 12 (namely the horizontal direction) and an insertion direction of the battery 20 (namely the vertical direction). Hence the bending rigidity of the retention arms 80 in the insertion direction of the battery 20 is reduced. This facilitates insertion of the battery 20 into the housing 12 with a low insertion force. The inclined configuration of the retention arms 80 forms a downward directed (or battery pointing) end of each retention arm 80 that prevents the battery 20 from moving in a direction opposite to the insertion direction and thus securely retaining the battery 20 inside the housing 12 of the connector 10.

A spring tab 82 is formed on a front side of the contact panel 78 for biasing the battery 20 against the retention arms 80 and the walls 16 so as to securely fix the battery 20 inside the housing 12. In the embodiment illustrated, the spring tab 82 is formed by stamping the contact panel 78. Hence, the spring tab 82 also helps forming a reliable engagement between the battery 20 and the positive terminal 70. Understandably, both spring tab 82 and the retention arms 80 establish electrical connection with the battery 20.

A manual operation arm 84 extends from the top edge of the contact panel 78 in a direction opposite to the retentions arms 80, that is away from the battery 20. A free end of the operation arm 84 forms a perpendicular flange 86 for user's operation to forcibly deflect the contact panel 78 in such a way to disengage the retention arms 80 from the battery 20 thereby releasing the battery 20. In this respect, the biasing force of the spring tab 82 helps driving the battery 20 out of the housing 12.

A bifurcate soldering tail 88 perpendicularly extends from the base panel 72 of the positive terminal 70. The soldering tail 88 has two branches 90 straddling on and supported by a support block 38 projecting from the housing 12. Preferably, a slit 40 is defined in the support block 38 for interferentially or non-interferentially receiving a portion of the soldering tail 88. The branches 90 can be received in corresponding holes of the circuit board and soldered to the circuit board.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A coin battery connector adapted to receive a coin battery, the battery connector comprising:

an insulative housing comprising a flat base extending in a horizontal direction and two first walls and two second walls extending from the flat base in a vertical direction defining a cavity therebetween for receiving a coin battery, first and second slots being respectively defined in the housing between the first walls and between the second walls;

negative and positive terminals made of conductive materials received and retained in the first and second slots respectively; and the positive terminal comprising a contact panel retained in the second slot and adapted to engage a positive electrode of the battery, a retention arm extending from the contact panel in an inclined direction toward the flat base of the housing and adapted to engage and thus retain the battery in the housing, and a manual operation arm extending from the contact panel in a direction substantially opposite to the retention arm, the contact panel being manually deflectable by moving the manual operation arm for disengaging the retention arm from the battery.

2. The coin battery connector as claimed in claim 1, wherein each first wall forms inward directed flange for retaining the battery in the housing.

3. The coin battery connector as claimed in claim 2, wherein the inward directed flange has a completely flat top surface.

4. The coin battery connector as claimed in claim 1, wherein two retention arms extend from the contact panel.

5. The coin battery connector as claimed in claim 1, wherein the second slot is defined between two wall segments respectively extending from the second walls and opposite to each other, each wall segment having an inner surface forming a slot, the positive terminal comprising a base panel and two side panels extending from the base panels and respectively received in the slots of the wall segments.

6. The coin battery connector as claimed in claim 5, wherein a notch is defined in the inner surface of each wall segment, a projection being formed on each side panel of the positive terminal for engaging the notch of the corresponding wall segment.

7. The coin battery connector as claimed in claim 5, wherein the flat base of the housing forms a boss in the second slot for being fit into a hole defined in the base panel of the positive terminal to positioning and retaining the positive terminal in the second slot of the housing.

8. The coin battery connector as claimed in claim 5, wherein a soldering tail perpendicularly extends from the base panel, the soldering tail having a bifurcate configuration comprising two spaced branches straddling on a support block extending from the housing.

9. The coin battery connector as claimed in claim 5, wherein a spring tab is mounted to e contact panel for engaging and biasing the battery against the battery pointing end of the retention arm.

10. A coin battery connector adapted to receive a coin battery, the coin battery connector comprising an insulative housing defining a cavity for receiving the coin battery, and positive and negative terminals made of conductive materials mounted to the housing for respectively engaging positive and negative electrodes of the battery, the positive terminal comprising a contact panel adapted to engage the positive electrode of the battery, two retention arms formed on the contact panel, and a spring tab formed on the contact panel for engaging and biasing the battery against the retention arms, each retention arm having a major surface inclined with respect to an insertion direction of the battery for guiding facilitating insertion of the battery into the housing, the retention arms having downward directed free ends for engaging and retaining the battery in the housing, the negative terminal comprising a bifurcate configuration having two spaced, longitudinally extending spring arms projecting upward from a bottom of the housing in an inclined direction into the housing, each spring arm having a contact for engaging with the negative electrode of the battery.

11. A battery connector assembly comprising:

an insulative housing defining a flat base with upwardly extending walls aside, said flat base and the walls together defining a cavity therein;

a battery received in the cavity; and first and second terminals respectively disposed in the housing with contacting sections respectively mechanically and electrically engaged with positive and negative electrodes of the battery; wherein one of said two terminals includes a retention device to efficiently hold the battery in the cavity and an operation portion being easy to access and operate for disengaging the retention device from said battery;

wherein said base defines a flat base and the battery is loaded into the cavity in a direction perpendicular to said flat face, and said retention device cooperates with protrusions of the walls to hold the battery in the cavity to prevent said battery from withdrawal from the cavity in an opposite direction.

* * * * *